United States Patent [19]

Szmuszkovicz

[11] 3,853,881
[45] Dec. 10, 1974

[54] DIBENZO [B,F]-S-TRIAZOLO [4,3-D] [1,4] THIAZEPINES-3-ONES AND DIOXO DERIVATIVES THEREOF

[75] Inventor: Jacob Szmuszkovicz, Kalamazoo, Mich.

[73] Assignee: The Upjohn Company, Kalamazoo, Mich.

[22] Filed: Aug. 7, 1973

[21] Appl. No.: 386,279

Related U.S. Application Data

[63] Continuation-in-part of Ser. No. 307,113, Nov. 16, 1972, abandoned, which is a continuation-in-part of Ser. No. 220,405, Jan. 24, 1972, abandoned.

[52] U.S. Cl............. 260/268 PC, 71/90, 71/91, 260/239.3 T, 260/293.57, 260/308 C, 424/250, 424/267, 424/269
[51] Int. Cl............................................ C07d 99/10
[58] Field of Search...... 260/308 C, 268 PC, 293.57

[56] References Cited
UNITED STATES PATENTS

| | | | |
|---|---|---|---|
| 3,201,404 | 8/1965 | Ruschig et al. | 260/308 C |
| 3,362,962 | 1/1968 | Reeder et al. | 260/327 B |
| 3,509,154 | 4/1970 | Fouche | 260/327 B |
| 3,514,466 | 5/1970 | Stahle et al. | 260/308 C |
| 3,644,334 | 2/1972 | Ning et al. | 260/239 BD |
| 3,646,055 | 2/1972 | Hester | 260/308 C |

*Primary Examiner*—Alton D. Rollins

[57] ABSTRACT

Compounds of the formula IV:

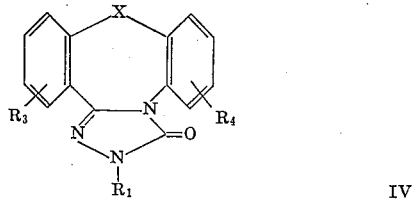

wherein X is selected from the group consisting of sulfur and

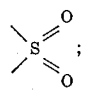

wherein $R_1$ is selected from the group consisting of hydrogen, alkyl of one to three carbon atoms, inclusive;

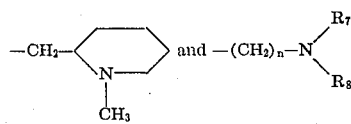

in which $n$ is 2 or 3, $R_7$ and $R_8$ are hydrogen or alkyl, as defined above, or together

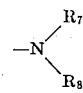

is pyrrolidino, piperidino or N-methylpiperazino; wherein $R_3$ and $R_4$ are selected from the group consisting of hydrogen, fluoro, chloro, bromo, or alkyl, defined as above, and alkoxy of one to three carbon atoms, inclusive, are prepared by reacting a thio compound of formula I:

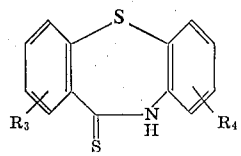

wherein $R_3$ and $R_4$ are defined as above, in sequence:

1. with an alkylcarbazate; and the resulting product II 2. with an alkylating agent of the formula $R_1'Cl$ in which $R_1'$ is alkyl as defined above,

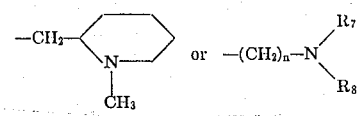

as defined above in the presence of a strong base; to obtain the compound VI (with X' is sulfur) as defined above.

If X is

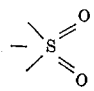

is desired the compound II is oxidized e.g. m-perchlorobenzoic acid to give compound III or compound V may be oxidized to give a compound IV with R' as substituent.

Compounds of formula II, III, IV, and V can be presented in one formula as compound VI which including pharmacologically acceptable acid addition salts thereof has sedative and anti-depressant activity and can be used in mammals.

14 Claims, No Drawings

DIBENZO [B,F]-S-TRIAZOLO [4,3-D][1,4] THIAZEPINES-3-ONES AND DIOXO DERIVATIVES THEREOF

CROSS REFERENCE TO RELATED APPLICATION

This application is a continuation-in-part of application Ser. No. 307,113 filed Nov. 16, 1972, and now abandoned which is a continuation-in-part of application Ser. No. 220,405, filed Jan. 24, 1972 and now abandoned.

BACKGROUND OF THE INVENTION

1. Field of the Invention

This invention is directed to new organic compounds and is particularly concerned with novel compounds of formula VI and a process for the production thereof.

The novel compounds and the process of production therefor can be illustratively represented as follows:

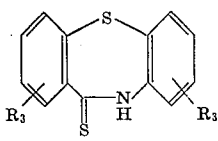
I

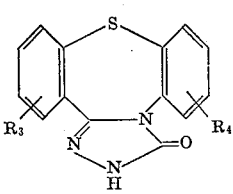
II

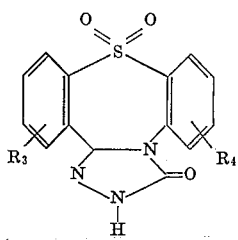
III

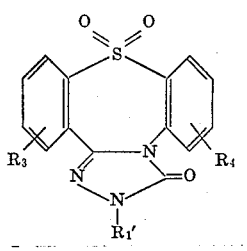
IV

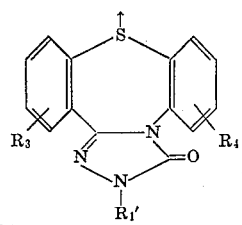
V

The compounds of the above formulae II, III, IV, and V can be represented combined as a compound of formula VI

VI

In these formulae I through VI the parameters X, $R_1$, $R_1'$, $R_3$, and $R_4$ have always the same meaning, i.e. X is sulfur or

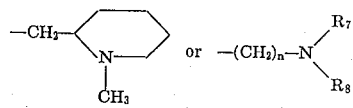

$R_1'$ is alkyl of one to three carbon atoms, inclusive,

in which $n$ is 2 or 3; and $R_7$ and $R_8$ are hydrogen or alkyl defined as above, or together $$-N\begin{matrix}R_7\\R_8\end{matrix}$$

is pyrrolidino, piperidino, or N-methylpiperazino; wherein $R_3$ and $R_4$ are selected from the group consisting of hydrogen, fluoro, chloro, bromo, alkyl defined as above, or alkoxy of one to three carbon atoms, inclusive; and wherein $R_7$ is hydrogen or $R_1'$ defined as above.

The invention also embraces the pharmacologically acceptable acid addition salts thereof of the compounds of formula IV above.

The more desirable compounds of this invention are of the formula VIA

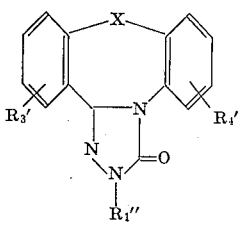

VIA wherein X is sulfur or

wherein $R_1''$ is hydrogen, alkyl of one to three carbon atoms, inclusive, or

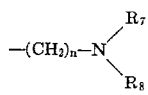

in which $n$ is 2 or 3; $R_7$ and $R_8$ are hydrogen or alkyl defined as above, or together

is pyrrolidino, piperidino; or N methylpiperazino and wherein $R_3'$ and $R_4'$ are hydrogen or halogen and the pharmacologically acceptable acid addition salts thereof.

The most desirable compounds of this invention are of the formula VIB:

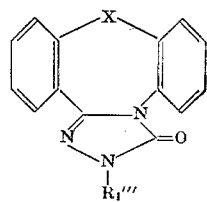

VIB wherein X is selected from the group consisting of sulfur and

and wherein $R_1'''$ is

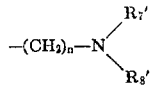

in which $R_7'$ and $R_8'$ are hydrogen or alkyl of one to three carbon atoms, inclusive; and the pharmacologically acceptable acid addition salts thereof.

The process of this invention comprises heating a thio compound of formula I with an alkyl carbazate to obtain the triazolone compound II and alkylating II with a compound of formula $ClR_1'$, $BrR_1'$, or $IR_1'$, in which $R_1'$ is alkyl of one to three carbon atoms, inclusive;

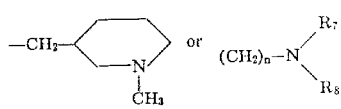

defined as above to produce a compound of formula V above, and if desired oxidizing II with a perbenzoic acid to obtain a compound of formula IV wherein X is $SO_2$.

DESCRIPTION OF THE PREFERRED EMBODIMENT

Lower alkyl groups of one to three carbon atoms, inclusive, are exemplified by methyl, ethyl, propyl, and isopropyl.

The carbon chain moiety of alkoxy, is of one to three carbon atoms, inclusive, can be defined as lower-alkyl of one to three carbon atoms, inclusive as above.

The novel compounds of formula VI (including VIA and VIB) and pharmacologically acceptable acid addition salts thereof have antidepressant activity and are thus useful for the treatment of depression in mammals or birds.

The main function of an antidepressant is to return the depressed individual to normal function. This should be carefully differentiated from psychic stimulants such as the amphetamines which produce overstimulation in the normal individual.

Many different methods have been and are used to evaluate antidepressant activity. In general these methods involve antagonism to a depressant such as reserpine or tetrabenazine or a synergistic increase of the toxicity of certain compounds (i.e. yohimbine or 3,4-dihydroxyphenylalanine) and comparison of the drug action of the new compound with other known antidepressants. No single test alone can determine whether or not a new compound is an antidepressant or not, but the profile evidenced by various tests will establish the anti-depressant action if present. A number of such tests are described below.

Hypothermic tests with oxotremorine: [1-[4-(pyrrolidinyl)-2-butynyl]-2-pyrrolidinone].

Oxotremorine (as well as apomorphine and tetrabenazine) produces hypothermic responses in mice. This response is blocked by anticholinergics and antidepressants such as atropine and imipramine.

Oxotremorine produces a very pronounced hypothermia which reaches a peak 60 minutes after administration.

At 0.6 mg./kg. the body temperature of a mouse is decrease about 13° F. (when the mouse is kept at room temperature). This temperature decrease is antagonized by anti-depressants e.g. desipramine, imipramine, doxepine, and others as can be seen from Table I.

TABLE I

Effect of Various Compounds on Oxotremorine-Induced Hypothermia in Mice

| Compound | Dose mg./kg., I. P. | Absorption Time (min) | Body Temperature °F—Change From Vehicle Control After Minutes | | | |
|---|---|---|---|---|---|---|
| | | | 15 | 30 | 60 | 90 |
| oxotremorine (control) | 0.6 | | −5.8 | −11.6 | −13.2 | −8.0 |
| Desipramine | 25 | 30 | −3.5 | −3.5 | −4.1 | −3.6 |
| Imipramine | 25 | 30 | −0.4 | −3.3 | −5.6 | −6.4 |
| Iprindole | 25 | 30 | −6.3 | −11.8 | −12.8 | −11.9 |
| Doxepine | 25 | 30 | −2.3 | −7.1 | −11.0 | −12.3 |
| Amitriptyline | 25 | 30 | +0.7 | −2.4 | −5.4 | −6.8 |
| Amphetamine | 5 | 30 | −1.5 | −4.3 | −4.4 | −2.2 |
| Atropine | 3 | 30 | +0.6 | −0.6 | −0.7 | −0.2 |

The present compounds were tested as follows. Four male mice 18–22 g. (Strain CF = Carworth Farms) were injected intraperitoneally with 1 mg. of oxotremorine. The lowering of the body temperature was measured rectally with an electronic thermometer, before and 30 minutes after drug administration. After the drug administration the mice were kept at 19° C. in cages. A four degree higher body temperature of the treated mice (oxotremorine and test compound) versus the control mice (oxotremorine only) is used as a positive result.

The results are tabulated below:

TABLE II

2-[2-(dimethylamino)ethyl]dibenzo[b,f]-s-triazolo[4,3-d]-[1,4]thiazepin-3-(2H)-one hydrochloride (A) —12.5 mg.

9,9-dioxo-2-[2-(dimethylamino)ethyl]-dibenzo[b,f]-s-triazolo[4,3-d][1,4]thiazepin-3-(2H)-one (B) —5.3 mg.

Potentiation of yohimbine aggregation toxicity: the $LD_{50}$ of yohimbine hydrochloride in mice is 45 mg./kg. i.p. Administration of 30 mg./kg. of yohimbine hydrochloride was non-lethal. If an antidepressant is administered prior to the yohimbine hydrochloride (30 mg.) the lethality of the yohimbine hydrochloride is increased.

Ten male CF mice, 18–22 g., were injected with yohimbine hydrochloride in saline solution. After 2 hours, the $LD_{50}$ are determined. Groups of 10 mice are injected with the antidepressant 30 minutes before the administration of yohimbine hydrochloride [YCl] (30 mg.). No mice or only one mouse is killed from 30 mg. of [YCl]. If [YCl] is administered in the presence of an anti-depressant an increase in the toxicity of [YCl] is found. The $ED_{50}$ value of the two compounds A and B in causing 50 percent of the mice to die is shown in Table III:

TABLE III

| | $ED_{50}$ mg./kg. |
|---|---|
| [YCl] (30 mg.) control | no deaths |
| [YCl] (30 mg.) and A | 3.7 mg. (A) |
| [YCl] (30 mg.) and B | 7.2 mg. (B) |
| [YCl] (30 mg.) and Imipramine | 3.7 mg. |

Potentiation of apomorphine gnawing: a group of 4 mice (male, CF, 18–22 g.) are administered the test compound intraperitoneally one hour prior to the subcutaneous injection of apomorphine hydrochloride 1 mg./kg. The mice are then placed in a plastic box [6 × 11 × 5 inches] lined at the bottom with a cellophane-backed, absorbent paper. The degree of damage to the paper at the end of 30 min. is scored from zero to 4. The scores 3 and 4 indicate that the compound is a potentiator of apomorphine in this test. Compounds A and B were both positive in this test at 14.9 mg./kg. and 12.5 mg./kg. respectively, in mice. Imipramine in this test is positive at 17.7 mg./kg.

The above results show that compounds of formula VI and the pharmacologically acceptable acid addition salts thereof can be used as antidepressants in mammals to achieve normalcy in the depressed indivicual.

The pharmaceutical forms of compounds of formula VI (including VIA and VIB) and salts thereof contemplated by this invention include pharmaceutical composition suited for oral, parenteral, and rectal use, e.g., tablets, powder packets, cachets, dragees, capsules, solutions, suspensions, sterile injectable forms, suppositories, bougies, and the like. Suitable diluents or carriers such as carbohydrates, lactose, proteins, lipids, calcium phosphate, cornstarch, stearic acid, methylcellulose and the like may be used as carriers or for coating purposes. Water or oils such as coconut oil, sesame oil, safflower oil, cottonseed oil, and peanut oil, may be used for preparing solutions or suspensions of the active drug. Sweetening, coloring, and flavoring agents may be added.

For mammals food premixes with starch, oatmeal, dried fishmeat, fishmeal, flour, and the like can be prepared.

As antidepressants the compounds of formulae IV and their pharmacologically acceptable acid addition salts can be used in dosages of 0.5–25 mg./kg. (with 1 to 15 mg. preferred) in oral or injectable preparations as described above to alleviate depression occurring in stressful situations. Such situations are those for example, when animals are changing ownerships or are temporarily put into kennels while their owners are absent from home.

Sedative effects have been measured in compounds A and B and additionally in compounds:

7-chloro-2-[2-(dimethylamino)ethyl]-dibenzo[b,f]-s-triazolo-4,3-d][1,4]thiazepin-3(2H)-one (C)

7-Chloro-2-[3-(dimethylamino)propyl]-dibenzo[b,f]-s-triazolo[4,3-d][1,4]thiazepin-3(2H)-one (D)

as follows:

Chimney test: [Med. Exp. 4 145 (1961)]: The test determines the ability of mice to back up and out of a vertical glass cylinder within 30 seconds. At the effective dosage, 50 percent of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50 percent of the mice remain in the dish.

Pedestal test: The untreated mouse leaves the pedestal in less than a minute to climb back to the floor of the standard mouse box. Tranquilized mice will stay on the pedestal for more than 1 minute.

Nicotine antagonism test: Mice in a group of 6 are injected with the test compound. Thirty minutes later the mice including control (untreated) mice are injected intraperitoneally with nicotine salicylate (2 mg./kg.). The control mice show overstimulation, i.e., (1) running convulsions followed by (2) tonic extensor fits; followed by (3) death.

The tests for the four compounds A, B, C, and D above show that these compounds are useful as anticonvulsive, sedatives, and tranquilizers at dosages of 1 to 15 mg./kg. in mammals. For large animals the low dosage range is effective.

Acid addition salts of the compounds of formula IV can be made, such as the fluosilicic acid addition salts which can be applied as mothproofing agents, and salts with trichloroacetic acid are useful as herbicides against Johnson grass, Bermuda grass, yellow and red foxtail, and quack grass.

The starting materials of this invention are dibenzothiazepinethiones I which are either known or can be synthesized, for simplicity by treating the corresponding oxo compounds with phosphorus pentasulfide or as further illustrated by Preparation 1. The necessary oxo compound dibenzo-[b,f]-s-triazolo[4,3-d][1,4]thiazepin-3(2H)-ones as well as several methods for the preparation thereof, are found in Schmutz, Helv. Chim. Acta. 48, 336 (1965).

In carrying out the process of this invention, a selected thione I, is heated with an alkyl carbazate of the formula:

$$H_2N—NH—COOAlk$$

in which the alkyl groups is of one to three carbon atoms, inclusive. Usually ethyl carbazate is preferred, but higher or lower alkyl carbazates are operative. In the preferred embodiment of this invention, the selected thione I is heated with ethyl carbazate in large excess for ½ hours to 3 hours at 190° to 250° C. in an oil bath. The alkyl carbazate serves simultaneously as reagent and solvent. The product usually precipitates upon cooling of the reaction mixture and is recovered by filtration and purified by conventional means, e.g., extractions of impurities, chromatography or most commonly by recrystallization. The triazolone compound II is thus, obtained.

Alkylation of II is achieved by reacting the product II with a strong base e.g. sodium or potassium hydride in an organic solvent, e.g. dimethylformamide, diethylformamide, diethylacetamide, tetrahydrofuran, dioxane, benzene or the like with an excess of the base, followed by reacting the alkali metal salt thus formed with $R_1'X$ in which X is chlorine, bromine, or iodine and $R_1'$ is defined as herein above. Both reactions, formation of salt and the reaction of this salt with $R_1'X$, are usually performed at elevated temperatures between 50° to 125° C. The conversion of II to its alkali salt is usually performed during 15–75 minutes. The reaction of the salt with the chloride is carried out during a longer period of time by keeping the reaction mixture at the elevated temperature for 1 to 38 hours. The product III, thus obtained, is isolated and purified by conventional means, e.g. extraction, chromatography, crystallization and the like.

Compound III or compound II with a peracid for example m-chloroperbenzoic acid, perbenzoic, peracetic, or perpropionic acid gives the compounds of formula IV in which x is $SO_2$.

The following preparations and examples are illustrative of the processes and products of the present invention, but are not to be construed as limiting.

PREPARATION 1

Dibenzo[b,f][1,4]thiazepine-11(10H)-thione

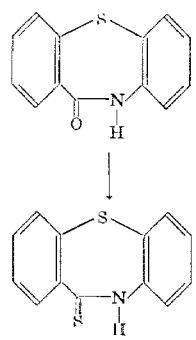

A mixture of dibenzo[b,f][1,4]thiazepin-11(10H)-one and phosphorus pentasulfide in pyridine was heated at reflux for 6 hours. The pyridine is evaporated in vacuo and the residue is extracted with chloroform. The chloroform layer was washed with water and brine, dried and evaporated. This residue is recrystallized from methanol to give dibenzo[b,f][1,4]thiazepine-11(10H)-thione of melting point 246°–247.5° C.

Other starting materials of formula I are produced as shown in Preparation 1 from the corresponding dibenzo-[b,f]thiazepin-11(10H)-one. Such starting compounds include:
2-methoxy-dibenzo[b,f][1,4]thiazepine-11(10H)-thione;
3-isopropyl-dibenzo[b,f]1.4]thiazepin-11(10H)-thione;
3,7-diethyldibenzo[b,f][1,4]thiazepin-11(10H)-thione;
8-bromodibenzo[b,f][1,4]thiazepin-11(10H)-thione;
9-fluoro-dibenzo[b,f][1,4]thiazepin-11(10H)-thione;
7-chloro-bibenzo[b,f][1,4]thiazepin-11(10H)-thione;
7-fluorodibenzo[b,f][1,4]thiazepin-11(10H)-thione;

6-bromodibenzo[b,f][1,4]thiazepin-11(10H)-thione;
6,12-dichloro-dibenzo[b,f][1,4]thiazepin-11(10H)-thione;
7,11-dimethyl-dibenzo[b,f][1,4]thiazepin-11(10H)-thione;

EXAMPLE 1

Dibenzo[b,f]-s-triazolo[4,3-d][1,4]thiazepin-3(2H)-one

Dibenzo[b,f][1,4]thiazepin-11(10H)-thione and ethyl carbazate are reacted at 195°–205° C. in an oil bath. The resulting mixture was extracted with methylene chloride, the extracts evaporated and the residue recrystallized to give dibenzo[b,f]-s-triazolo[4,3-d][1,4]thiazepin-3(2H)-one of melting point 302°–303° C.
Anal. calcd. for $C_{14}H_9N_3OS$:
  C, 62.90; H, 3.39; N, 15.72; S, 12.00.
Found:
  C, 62.89; H, 3.43; N, 16.03; S, 12.14.

EXAMPLE 2

2-[2-(dimethylamino)ethyl]dibenzo[b,f]-s-triazolo[4,3-d][1,4]thiazepin-3(2H)-one hydrochloride Dibenzo[b,f]-s-triazolo[4,3-d][1,4]thiazepin-3(2H)-one is first treated with a sodium hydride dispersion in mineral oil, and the resulting product is treated with (dimethylamino)ethyl chloride to give after extraction with hydrochloric acid 2-[2-(dimethylamino)ethyl]-dibenzo[b,f]-s-triazolo[4,3-d][1,4]thiazepin-3(2H)-one hydrochloride of melting point 292°–293° C.
Anal. calcd. for $C_{18}H_{18}N_4OS$:
  C, 57.67; H, 5.11; Cl, 9.46; N, 14.95; S, 8.55.
Found:
  C, 57.61; H, 5.09; Cl, 9.50; N, 15.17; S, 8.28.

EXAMPLE 3

7-Chloro-dibenzo[b,f]-s-triazolo[4,3-d][1,4]-thiazepin-3(2H)-one

In the manner given in Example 1, 7-chloro-dibenzo[b,f][1,4]thiazepin-11-(10H)-thione and ethyl carbazate are reacted to give 7-chloro-dibenzo[b,f]-s-triazolo-[4,3-d]-[1,4]thiazepin-3(2H)-one of melting point 215°–216°.
Anal. calcd. for $C_{14}H_{18}ClN_3OS \cdot 0.075 CHCl_3$:
  C, 54.65; H, 2.63; Cl, 14.04; N, 13.58; S, 10.37; $CHCl_3$, 3.72.
Found:
  C, 54.12; H, 2.60; Cl, 14.16; N, 13.62; S, 10.31; $CHCl_3$, 3.08.

EXAMPLE 4

7-Chloro-2-[2-(dimethylamino)ethyl]-dibenzo-[b,f]-s-triazolo[4,3-d][1,4]thiazepin-3(2H)-one In the manner given in Example 2, 7-chloro-dibenzo-[b,f]-s-triazolo[4,3-d][1,4]thiazepin-3-(2H)-one is first reacted with sodium hydride, and the resulting product with 2-(dimethylamino)ethyl chloride to give 7-chloro-2-[2-(dimethylamino)ethyl]dibenzo[b,f]-s-triazolo[4,3-d][1,4]-thiazepin-3(2H)-one of melting point 121°–122° C.

EXAMPLE 5

7-Chloro-2-[3-(dimethylamino)propyl]-dibenzo-[b,f]-s-triazolo[4,3-d][1,4]thiazepin-3(2H)-one In the manner given in Example 4, 7-chloro-dibenzo-[b,f]-s-triazolo[4,3-d][1,4]thiazepin-3(2H)-one is first reacted with sodium hydride and the resulting product with 3-(dimethylamino)propyl chloride to give 7-chloro-2-[3-(dimethylamino)propyl]dibenzo[b,f]-s-triazolo[4,3-c][1,4]-thiazepin-3(2H)-one of melting point 123°–125° C.
Anal. calcd. for $C_{19}H_{19}ClN_4OS$:
  C, 59.98; H, 4.95; Cl, 9.16; N, 14.48; S, 8.29.
Found:
  C, 59.03; H, 5.12; Cl, 9.38; N, 14.03; S, 8.61.

EXAMPLE 6

2-[2-(phthalimido)ethyl]-dibenzo[b,f]-s-triazolo-[4,3-d][1,4]thiazepin-3(2H)-one In the manner given in Example 2, dibenzo[b,f]-s-triazolo[4,3-d][1,4]thiazepin-3(2H)-one is first reacted with sodium hydride, and the resulting product with N-(2-bromoethyl)phthalimide to give 2-[2-(phthalimido)ethyl]-dibenzo[b,f]-s-trizolo[4,3-d][1,4]thiazepin-3-(2H)-one.

EXAMPLE 7

2-[2-(amino)ethyl]-dibenzo[b,f]-s-triazolo[4,3-d]-[1,4]thiazepin-3(2H)-one

A mixture of 2-[2-(phthalimido)ethyl]dibenzo[b,f]-s-triazolo[4,3-d][1,4]thiazepin-3(2H)-one (4.47 mmole), hydrazine hydrate (0.0179 mole) and 25 ml. of ethanol is stirred at room temperature for 24 hours. The resulting suspension is filtered and the filtrate evaporated. The residue is dissolved in methylene chloride and water, the organic layer is washed with water, dried over anhydrous magnesium sulfate and evaporated to give 2-[2-(amino)ethyl]-dibenzo[b,f]-s-triazolo[4,3-d][1,4]thiazepin-3(2H)-one.

EXAMPLE 8

2-[2-(benzylmethylamino)ethyl]-dibenzo[b,f]-s-triazolo[4,3-d][1,4]thiazepin-3(2H)-one In the manner given in Example 2, dibenzo[b,f]-s-triazolo[4,3-d][1,4]thiazepin-3(2H)-one is first reacted with sodium hydride, and the resulting product with N-benzyl-N-methyl-2-chloroethylamine to give 2-[2-(benzylmethylamino)ethyl]-dibenzo[b,f]-s-triazolo[4,3-d][1,4]thiazepin-3(2H)-one.

EXAMPLE 9

2-[2-(methylamino)ethyl]-dibenzo[b,f]-s-triazolo[4,3-d][1,4]thiazepin-3(2H)-one

A mixture of 2-[2-(benzylmethylamino)ethyl]dibenzo-[b,f]-s-triazolo[4,3-d][1,4]thiazepin-3(2H)-one (0.0367 mole)) 1.1 g. of 10% palladium on carbon, 74 ml. of 1N hydrogen chloride (0.0734 mole) in ether and 240 ml. of methanol is hydrogenated at 50 p.s.i, until absorption of hydrogen was complete. The mixture was filtered and the filtrate evaporated to give 2-[2-(methylaminoethyl]-dibenzo[b,f]-s-triazolo[4,3-d][1,4]thiazepin-3(2H)-one.

EXAMPLE 10

9,9-Dioxo-dibenzo[b,f]-s-triazolo[4,3-d][1,4]-thiazepin-3(2H)-one

Dibenzo[b,f]-s-triazolo[4,3-d][1,4]thiazepin-3(2H)-one (1.3 g., 0.005 mole) is dissolved in chloroform-methanol (1:1) on a steam bath and cooled to room temperature. Meta-chloroperbenzoic acid (1.72 g., 0.01 mole, 85%) is added to this mixture with stirring. A precipitate forms in 10–15 minutes and stirring is continued overnight to give a clear solution. The solution is transferred to a separatory funnel and washed with 25 ml. of saturated sodium bicarbonate and 50 ml. of water. The organic layer is separated and washed with 2 × 25 ml. of saturated sodium bicarbonate and 1 × 25 ml. saturated sodium chloride. The separated organic layer is evaporated to dryness to give a white solid (1.7 g.). Crystallization from acetic acid gives 9,9-dioxo-dibenzo[b,f]-s-triazolo[4,3-d][1,4]thiazepin-3(2H)-one of melting point 307° C. (damp). Recrystallization from methanol-methylene chloride gives 0.763 g. of pure compound, melting point 304°–306° C.
Anal. calcd. for $C_{14}H_9N_3O_3S$ (299.30):
  C, 56.18; H, 3.30; N, 14.04; S, 10.72.
Found:
  C, 56.27; H, 3.29; N, 14.26; S, 10.53.

EXAMPLE 11

9,9-dioxo-2-[2-(dimethylamino)]ethyldibenzo-[b,f]-s-triazolo[4,3-d][1,4]thiazepin-3(2H)-one 9,9-Dioxo-dibenzo[b,f]-s-triazolo[4,3-d][1,4]thiazepin-3(2H)-one (1.49 g., 0.005 mole) is dissolved in dimethylformamide, sodium hydride (0.12 g.; 0.005 mole) is added and the solution is heated on a steam bath for 40 minutes until a clear solution results. 2-(Dimethylamino)ethyl chloride (0.535 gm.) in xylene (1:1; 1.07 g.) is added and the solution heated on a steam bath for 17 hours. Water and methylene chloride are added, the organic layer is separated and extracted with 3 × 15 ml. of 10% hydrochloric acid. The acid extract is cooled, made basic with 20% sodium hydroxide and extracted with methylene chloride and dried over anhydrous magnesium sulfate. Evaporation gives a solid (1.6 g.). Crystallization from methanol-chloroform (1:1) of this solid gives 9,9-dioxo-2-[2-(dimethyl-amino-dibenzo[b,f]-s-triazolo[4,3-d][1,4]thiazepin-3(2H)-one (1.3 g.) of melting point 200°–201° C. This was recrystallized again to give the compound as colorless prisms. 1.175 g. of melting point 202°–203° C.
Anal. calcd. for $C_{13}H_{18}N_4O_3X$:
  C, 58.36; H, 4.89; N, 15.13; S, 8.66.
Found:
  C, 58.25; H, 4.92; N, 15.16; S, 8.66.

EXAMPLE 12

9,9-Dioxo-2-[2-(phthalimido)ethyl]-dibenzo[b,f]-s-triazolo[4,3-d][1,4]thiazepin-3(2H)-one In the manner given in Example 7, 9,9-dioxo-dibenzo-[b,f]-s-triazolo[4,3-d][1,4]thiazepin-3(2H)-one is first reacted with sodium hydride, and the resulting product with N-(2-bromoethyl)phthalimide to give 9,9-dioxo-2-[2-(phthalimido)ethy-dibenzo[b,f]-s-triazolo[4,3-d][1,4]thiazepin-3(2H)-one.

EXAMPLE 13

9,9-dioxo-2-[2-(amino)ethyl]-dibenzo[b,f]-s-triazolo[4,3-d][1,4]thiazepin-3(2H)-one In the manner given in Example 7, 9,9-dioxo-2-[2-(phthalimido)ethyl]dibenzo[b,f]-s-triazolo[4,3-d][1,4]-thiazepin-3(2H)-one is reacted with hydrazine hydrate in ethanol to give 9,9-dioxo-2-[2-(amino)ethyl]dibenzo[b,f]-s-triazolo[4,3-d][1,4]thiazepin-3(2H)-one.

EXAMPLE 14

9,9-Dioxo-2-[2-(benzylmethylamino)ethyl]dibenzo-[b,f]-s-triazolo[4,3-d][1,4]thiazepin-3(2H)-one In the manner given in Example 11, 9,9-dioxo-dibenzo-[b,f]-s-triazolo[4,3-d][1,4]thiazepin-3(2H)-one is first reacted with sodium hydride and the resulting product with N-benzyl-N-methyl-2-chloroethylamine to give 9,9-dioxo-2-[2-(benzylmethylamino)ethyl]dibenzo[b,f]-s-triazolo[4,3-d][1,4]thiazepin-3(2H)-one

EXAMPLE 15

9,9-Dioxo-2-[2-(methylamino)ethyl]dibenzo[b,f]-s-triazolo[4,3-d][1,4]thiazepin-3(2H)-one In the manner given in Example 9, 9,9-dioxo-2-[2-(benzylmethylamino)ethy-dibenzo[b,f]-s-triazolo[4,3-d][1,4]-thiazepin-3(2H)-one is hydrogenated to give 9,9-dioxo--[2-(methylamino)ethyl]dibenzo[b,f]-s-triazolo[4,3-d][1,4]-thiazepin-3(2H)-one

EXAMPLE 16

7-Fluoro-dibenzo[b,f]-s-triazolo[4,3-d][1,4]-thiazepin-3(2H)-one

In the manner given in Example 1, 7-fluoro-dibenzo[b,f][1,4]thiazepin-11(10H)-thione is heated with ethyl carbazate to give 7-fluoro-dibenzo[b,f]-s-triazolo[4,3-d] [1,4]thiazepin-3(2H)-one.

EXAMPLE 17

9,9-dioxo-7-fluoro-dibenzo[b,f]-s-triazolo-[4,3-d][1,4]thiazepin-3(2H)-one

In the manner given in Example 6, 7-fluoro-dibenzo-[b,f]-s-triazolo[4,3-d][1,4]thiazepin-3(2H)-one is oxidized with m-chloroperbenzoic acid to give 9,9-dioxo-7-fluorodibenzo[b,f]-s-triazolo[4,3-d][1,4]thiazepin-3(2H)-one.

EXAMPLE 18

7-Fluoro-2-[2-(dimethylamino)ethyl]dibenzo[b,f]-s-triazolo[4,3-d][1,4]thiazepin-3(2H)-one.

In the manner given in Example 4, 7-fluoro-dibenzo-[b,f]-s-triazolo[4,3-d][1,4]thiazepin-3(2H)-one is first reacted with sodium hydride and the resulting product with 2-(diethylamino)ethyl chloride to give 2-[2-(diethylamino)-ethyl]dibenzo[b,f]-s-triazolo[4,3-d][1,4]thiazepin-3(2H)-one.

EXAMPLE 19

6,12-Dimethyl-dibenzo[b,f]-s-triazolo[4,3-d]-[1,4]thiazepin-3(2-H)-one

In the manner given in Example 1, 2,8-dimethyldibenzo[b,f][1,4]thiazepin-11(10H)-thione is heated with ethyl carbazate to give 6,12-dimethyldibenzo[b,f]-s-triazolo-[4,3-d][1,4]thiazepin-3(2H)-one.

EXAMPLE 20

9,9-Dioxo-6,12-dimethyldibenzo[b,f]-s-triazolo-[4,3-d][1,4]thiazepin-3(2H)-one

In the manner given in Example 10, dibenzo[b,f]-s-triazolo[4,3-d][1,4]thiazepin-3(2H)-one is oxidized with m-chloroperbenzoic acid to give 9,9-dioxo-6,12-dimethyldibenzo[b,f]-s-triazolo[4,3-d][1,4]thiazepin-3-(2H)-one.

EXAMPLE 21

6,12-Dimethyl-2-[2-(N-methylpiperidino)ethyl]-dibenzo[b,f]-s-triazolo[4,3-d][1,4]thiazepin-3(2H)-one In the manner given in Example 2, 6,12-dimethyldibenzo[b,f]-s-triazolo[4,3-d][1,4]thiazepin-3(2H)-one is first reacted with sodium hydride and the resulting product with 2-(N-methylpiperidinyl)ethyl chloride to give T26,12-dimethyl-2-[2-(N-methylpiperidino)ethyl]dibenzo[b,f]-s-triazolo[4,3-d][1,4]thiazepin-3(2H)-one.

EXAMPLE 22

8-Bromo-dibenzo[b,f]-s-triazolo[4,3-d][1,4]thiazepin-3(2H)-one

In the manner given in Example 1, 6-bromo-dibenzo-[b,f][1,4]thiazepin-11(10H)thione is heated with ethyl carbazate to give 8-bromo-dibenzo[b,f]-s-triazolo[4,3-d][1,4]-thiazepin-3(2H)-one.

EXAMPLE 23

9,9-Dioxo-8-bromo-dibenzo[b,f]-s-triazolo[4,3-d]-[1,4]thiazepin-3(2H)-one

In the manner given in Example 10, 8-bromodibenzo-[b,f]-s-triazolo[4,3-d][1,4]thiazepin-3(2H)-one is oxidized with perbenzoic acid to give 9,9-dioxo-8-bromo-dibenzo-[b,f]-s-triazolo[4,3-d][1,4]thiazepin-3-(2H)-one.

EXAMPLE 24

8-bromo-2-[2-(dimethylamino)ethyl]dibenzo[b,f]-s-triazolo[4,3-d][1,4]thiazepin-3(2H)-one In the manner given in Example 2, 8-bromo-dibenzo-[b,f]-s-triazolo[4,3-d][1,4]thiazepin-3(2H)-one is first reacted with sodium hydride and the resulting product with (dimethylamino))ethyl chloride to give 8-bromo-2-[2-(dimethylamino)ethyl]dibenzo[b,f]-s-triazolo[4,3-d][1,4]thiazepin-3(2H)-one.

EXAMPLE 25

7,11-Diethyldibenzo[b,f]-s-triazolo[4,3-d][1,4]-thiazepin-3(2H)-one

In the manner given in Example 1, 3,7-diethyl-dibenzo-[b,f][1,4]thiazepin-11(10H)-thione is heated with ethylcarbazate to give 7,11-diethyl-dibenzo[b,f]-s-triazolo-[4,3-d][1,4]thiazepin-3(2H)-one.

EXAMPLE 26

9,9-dioxo-7,11-diethyl-dibenzo[b,f]-s-triazolo-[4,3-d][1,4]thiazepin-3(2H)-one

In the manner given in Example 10, 7,11-diethyldibenzo[b,f]-s-triazolo[4,3-d][1,4]thiazepin-3(2H)-one is oxidized with m-chloroperbenzoic acid to give 9,9-dioxo-7,11-diethyldibenzo[b,f]-s-triazolo[4,3-d][1,4]thiazepin-3-(2H)-one.

EXAMPLE 27

7,11-diethyl-2-[2-(pyrrolidino)ethyl]dibenzo-[b,f]-s-triazolo[4,3-d][1,4]thiazepin-3(2H)-one In the manner given in Example 4, 7,11-diethyl-dibenzo[b,f]-s-triazolo[4,3-d][1,4]thiazepin-3(2H)-one In the manner given in Example 2, 7,11-diethyl-dibenzo[b,f]-s-triazolo[4,3-d][1,4]thiazepin-3(2H)-one is first reacted with sodium hydride and the resulting product with 2-pyrrolidinoethyl chloride to give 7,11-diethyl-2-[2-(pyrrolidino)ethyl]dibenzo[b,f]-s-triazolo[4,3-d][1,4]thiazepin-3-(2H)-one.

EXAMPLE 28

12-Methoxy-dibenzo[b,f]-s-triazolo[4,3-d][1,4]-thiazepin-3(2H)-one

In the manner given in Example 1, 2-methoxy-dibenzo-[b,f][1,4]thiazepin-11(10H)-thione is heated with ethylcarbazate to give 12-methoxy-dibenzo[b,f]-s-triazolo[4,3-d]-[1,4]thiazepin-3(2H)-one.

EXAMPLE 29

9,9-Dioxo-12-methoxy-dibenzo[b,f]-s-triazolo-[4,3-d][1,4]thiazepin-3(2H)-one In the manner given in Example 6, 12-methoxydibenzo[b,f]-s-triazolo[4,3-d][1,4]thiazepin-3(2H)-one is oxidized with m-chloroperbenzoic acid to give 9,9-dioxo-12-methoxy-dibenzo[b,f]-s-triazolo[4,3-d][1,4]thiazepin-3(2H)-one.

EXAMPLE 30

12-methoxy-2-[2-(piperidino)ethyl]dibenzo[b,f]-s-triazolo[4,3-d][1,4]thiazepin-3(2H)-one In the manner given in Example 4, 12-methoxy-dibenzo-[b,f]-s-triazolo[4,3-d][1,4]thiazepin-3(2H)-one is first reacted with sodium hydride and the resulting product with 2-(piperidino)ethyl chloride to give 12-methoxy-2-[2-(piperidino)ethyl]dibenzo[b,f]-s-triazolo[4,3-d][1,4]thiazepin-3(2H)-one.

EXAMPLE 31

11-isopropyldibenzo[b,f]-s-triazolo[4,3-d][1,4]-thiazepin3(2H)-one

In the manner given in Example 1, 3-isopropyl-dibenzo-[b,f][1,4]thiazepin-11(10H)-thione is heated with ethyl carbazate to give 11-isopropyl-dibenzo[b,f]-s-triazolo[4,3-d]-[1,4]thiazepin-3(2H)-one.

EXAMPLE 32

9,9-Dioxo-11-isopropyl-dibenzo[b,f]-s-triazolo-[4,3-d][1,4]thiazepin-3(2H)-one In the manner given in Example 10, 11-isopropyl-dibenzo[b,f]-s-triazolo[4,3-d][1,4]thiazepin-3(2H)-one is oxidized with m-chloroperbenzoic acid to give 9,9-dioxo-11-isopropyl-dibenzo[b,f]-s-triazolo[4,3-d][1,4]thiazepin-3-(2H)-one.

EXAMPLE 33

11-Isopropyl-2-[2-(4-methylpiperazino)ethyl]-dibenzo[b,f]-s-triazolo[4,3-d][1,4]thiazepin-3(2H)-one In the manner given in Example 4, 11-isopropyl-dibenzo[b,f]-s-triazolo[4,3-d][1,4]thiazepin-3(2H)-one is first reacted with sodium hydride and the resulting product with 4-methylpiperazinoethyl chloride to give 11-isopropyl-2-[2-(4-methyl(piperazino)ethyl]dibenzo[b,f]-s-triazolo[4,3-]-[1,4]thiazepin-3(2H-one.

EXAMPLE 34

9,9-Dioxo-11-isopropyl-2-[2-(diethylamino)ethyl]-dibenzo[b,f]-s-triazolo[4,3-d][1,4]thiazepin-3(2H)-one In the manner given in Example 4, 9,9-dioxo-11-isopropyl-dibenzo[b,f]-s-triazolo[4,3-d][1,4]thiazepin-3(2H)-one is first reacted with sodium hydride and the resulting product with 2-(diethylamino)ethyl chloride to give 9,9-dioxo-11-isopropyl-2-[2-(diethylamino)ethyl]dibenzo[b,f]-s-triazolo[4,3-d][1,4]thiazepin-3(2H)-one.

In the same manner given in the prior examples other compounds of formula VI configurations can be prepared. Such compounds include:

2-[(2-methylamino)ethyl]-7-chlorodibenzo[b,f]-s-triazolo-[4,3-d][1,4]thiazepine-3(2H)-one;
2-[(2-pyrrolidino)ethyl]-7-chloro-dibenzo[b,f]-s-triazolo-[4,3-d][1,4]thiazepine-3(2H)-one;
2-ethyl-8-fluoro-dibenzo[b,f]-s-triazolo[4,3-d][1,4]thiazepine-3(2H)-one;
2-methyl-12-methoxy-5-bromo-dibenzo[b,f]-s-triazolo[4,3-d]-[1,4]thiazepine-3(2H)-one;
2-propyl-11-methyl-dibenzo[b,f]-s-triazolo[4,3-d][1,4]-thiazepine-3(2H)-one;
2-isopropyl-7-trifluoromethyl-dibenzo[b,f]-s-triazolo-[4,3-d][1,4]thiazepine-3(2H)-one;
2-[2-(piperidino)ethyl]-dibenzo[b,f]-s-triazolo[4,3-d]-[1,4]thiazepine-3(2H)-one;
2-[3-(piperidino)propyl]-dibenzo[b,f]-s-triazolo[4,3-d]-[1,4]thiazepine-3(2H)-one;
5-trifluoromethyl-dibenzo[b,f]-s-triazolo[4,3-d][1,4]thiazepine-3(2H)-one;
6-chloro-dibenzo[b,f]-s-triazolo[4,3-d][1,4]thiazepine-3(2H)-one;
8,13-dibromo-dibenzo[b,f]-s-triazolo[4,3-d][1,4]thiazepine-3(2H)-one;
5,10-dichloro-dibenzo[b,f]-s-triazolo[4,3d][1,4]thiazepine-3(2H)-one;
2-methyl-8,12-diethyl-dibenzo[b,f]-s-triazolo[4,3-d][1,4]-thiazepine-3(2H)-one;
5-propyl-dibenzo[b,f]-s-triazolo[4,3-d][1,4]thiazepine-3(2H)-one;
8-isopropyl-dibenzo[b,f]-s-triazolo[4,3-d][1,4]thiazepine-3(2H)-one;
2-isopropyl-10-methyl-dibenzo[b,f]-s-triazolo[4,3-d][1,4]-thiazepine-3(2H)-one.
2-[2-(4-methylpiperazino)ethyl]dibenzo[b,f]-s-triazolo-[4,3-d][1,4]thiazepin-3(2H)-one;
2-[2-(3-dimethylamino)propyl]dibenzo[b,f]-s-triazolo[4,3-d]-[1,4]thiazepin-3(2H)-one;
and the like.

The novel compounds of formula VI, VIA, and VIB included can be reacted with selected acids e.g. hydrochloric, hydrobromic, sulfuric, phosphoric, tartaric, citric, lactic, cyclohexanesulfamic, toluenesulfonic, and other acids to give the corresponding pharmaceutically acceptable acid addition salts. This reaction is carried out under conventional conditions, in solvents such as ether, dioxane, tetrahydrofuran and the like at room temperatures, and the resulting precipitate salts are collected by filtration. These salts can be used in place of the free base for the same pharmaceutical purpose described before.

I claim:

1. A compound of the formula VI

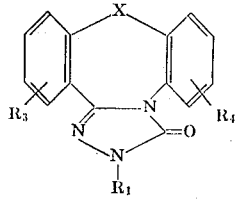   VI wherein X is sulfur or

 ;

wherein $R_1$ is hydrogen, alkyl of one to three carbon atoms, inclusive,

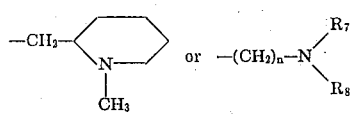

in which $n$ is 2 or 3, and $R_7$ and $R_8$ are hydrogen or alkyl defined as above, or together

is pyrrolidino, piperidino, or N-methylpiperazino; wherein $R_3$ and $R_4$ are selected from the group consisting of hydrogen, fluoro, chloro, bromo, alkyl, defined as above, or alkoxy of one to three carbon atoms, inclusive; and the pharmacologically acceptable acid addition salts thereof.

2. A compound according to claim 1 of the formula VIA

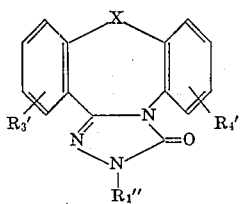   VIA wherein X is sulfur or

 ;

wherein $R_1''$ is hydrogen, alkyl of one to three carbon atoms, inclusive, or

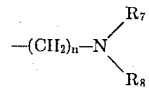

in which $n$ is 2 or 3; $R_7$ and $R_8$ are hydrogen or alkyl defined as above, or together

is pyrrolidino, piperidino, or N-methylpiperazino and wherein $R_3'$ and $R_4'$ are hydrogen or halogen and the pharmacologically acceptable acid addition salts thereof.

3. A compound according to claim 1 of the formula VIB

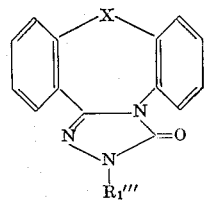   VIB wherein X is selected from the group consisting of sulfur and

 ;

and wherein $R_1'''$ is

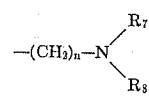

in which $R_7'$ and $R_8'$ are hydrogen or alkyl of one to three carbon atoms, inclusive; and the pharmacologically acceptable acid addition salts thereof.

4. A compound according to claim 3 wherein X is sulfur, $R_1'''$ is hydrogen, and the compound is therefore dibenzo-[b,f]-s-triazolo[4,3-d][1,4]thiazepin-3(2H)-one.

5. A compound according to claim 2 wherein X is sulfur $R_1''$ and $R_3'$ are hydrogen, $R_4'$ is 7-chloro, and the compound is therefore 7-chlorodibenzo[b,f]-s-triazolo[4,3-d][1,4]thiazepin-3(2H)-one.

6. A compound according to claim 2 wherein X is sulfur, $R_1''$ is 2-dimethylaminoethyl, $R_3'$ is hydrogen and $R_4'$ is 7-chloro and the compound is therefore 7-chloro-2-[2-(dimethylamino)ethyl]dibenzo[b,f]-s-triazolo[4,3-d][1,4]thiazepin-3(2H)-one.

7. A compound according to claim 2 wherein X is sulfur, $R_1''$ is 3-dimethylamino)propyl, $R_3'$ is hydrogen and $R_4'$ is 7-chloro and the compound is therefore 7- chloro-2-[3-(dimethylamino)propyl]dibenzo[b,f]-s-triazolo[4,3-d][1,4]thiazepin-3(2H)-one.

8. A compound according to claim 3, wherein X is

R₁′′′ is hydrogen and the compound is therefore 9,9-dioxodibenzo[b,f]-s-triazolo[4,3-d][1,4]thiazepin-3(2H)-one.

9. A compound according to claim 3, wherein X is

R₁′′′ is 2-dimethylaminoethyl, and the compound is therefore 9,9-dioxo-2-[2-(dimethylamino)ethyl]dibenzo[b,f]-s-triazolo[4,3-d][1,4]thiazepin-3(2H)-one.

10. A compound according to claim 3 wherein X is sulfur, R₁′′′ is dimethylaminoethyl and the compound is therefore 2-[2-(dimethylamino)ethyl]dibenzo[b,f]-s-triazolo[4,3-d][1,4]thiazepin-3(2H)-one hydrochloride.

11. A compound according to claim 3 wherein X is

R₁′′′ is

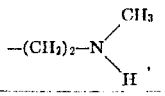

and the compound is therefore 9,9-dioxo-2-[2-(methylamino)ethyl]dibenzo[b,f]-s-triazolo[4,3-d][1,4]thiazepine-3(O2H)-one.

12. A compound according to claim 3 wherein X is

R₁′′′ is —(CH₂)₂—NH₂, and the compound is therefore 9,9-dioxo-2-[2-amino)ethyl]-dibenzo[b,f]-s-triazolo[4,3-d][1,4]thiazepin-3-(2H)-one.

13. A compound according to claim 3 wherein X is

R₁′′′ is

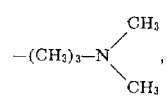

and the compound is therefore 9,9-dioxo-2-[3-(dimethylamino)propyl]dibenzo[b,f]-s-triazolo[4,3-d][1,4]thiazepin-3(2H)-one.

14. A compound according to claim 3, wherein X is

R₁′′′ is

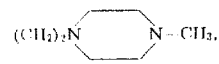

and the compound is therefore 9,9-dioxo-2-[(4-methylpiperazino)ethyl]dibenzo[b,f]-s-triazolo[4,3-d][1,4]thiazepin-3(2H)-one.

* * * * *

UNITED STATES PATENT OFFICE
CERTIFICATE OF CORRECTION

Patent No. 3,853,881    Dated December 10, 1974

Inventor(s) Jacob Szmuszkovicz

It is certified that error appears in the above-identified patent and that said Letters Patent are hereby corrected as shown below:

Column 1, line 25: Formula I should appear as shown below instead of as in the patent:

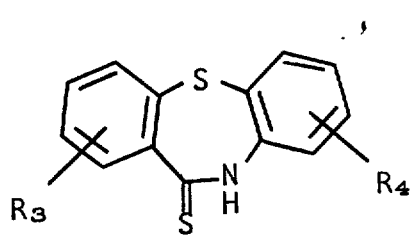

Column 4, line 28, "EMBODIIMENT" should read -- EMBODIMENT --.
Column 7, line 39, "equals" should read -- euqals --.
Column 8, line 46, "x" should read -- X --. Column 9, line 24, "bibenzo" should read -- dibenzo --. Column 12, lines 8-9, "dimethylamino-" should read -- dimethylamino)] --; line 32, "ethy-" should read -- ethyl] --; line 70, "ethy-" should read -- ethyl] --. Column 13, lines 2 and 8, "dioxo- -[2-" should read -- dioxo-2-[2- --; line 30, "dimethylamino" should read -- diethylamino --. Column 14, line 2, "T26,12" should read -- 6,12 --. Column 16, line 1, "methyl(piperazino)" should read -- methylpiperazino) --; line 1, "[4,3-]" should read -- [4,3-d] --; line 42, "[4,3d]" should read -- [4,3-d] --.
Column 19, line 41, Claim 11, "(02H)" should read -- (2H) --.
Column 20, line 5, Claim 12, "(CH2)2" should read -- (CH$_2$)$_2$ --;

UNITED STATES PATENT OFFICE
CERTIFICATE OF CORRECTION

Patent No. 3,853,881      Dated December 10, 1974

Inventor(s) Jacob Szmuszkovicz

It is certified that error appears in the above-identified patent and that said Letters Patent are hereby corrected as shown below:

Column 20, line 35, Claim 14: Formula should appear as shown below instead of as in the patent:

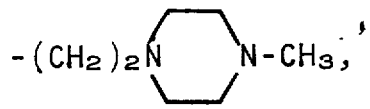

Signed and Sealed this

Twenty-first Day of September 1976

[SEAL]

Attest:

RUTH C. MASON
*Attesting Officer*

C. MARSHALL DANN
*Commissioner of Patents and Trademarks*